(12) United States Patent
Olry et al.

(10) Patent No.: US 6,319,348 B1
(45) Date of Patent: Nov. 20, 2001

(54) METHOD FOR PRODUCING RING-SHAPED FIBROUS STRUCTURES, IN PARTICULAR FOR MAKING PARTS IN COMPOSITE MATERIAL

(75) Inventors: Pierre Olry, Bordeaux; Dominique Coupe, Le Haillan; Bernard Lecerf, Gradignan; Jean-Michel Guirman, Begles, all of (FR)

(73) Assignee: Societe Nationale d'Etude et de Construction de Moteurs d'Aviation-SNECMA, Paris (FR)

( * ) Notice: Subject to any disclaimer, the term of this patent is extended or adjusted under 35 U.S.C. 154(b) by 0 days.

(21) Appl. No.: 09/381,943
(22) PCT Filed: Mar. 25, 1998
(86) PCT No.: PCT/FR98/00598
  § 371 Date: Sep. 27, 1999
  § 102(e) Date: Sep. 27, 1999
(87) PCT Pub. No.: WO98/44182
  PCT Pub. Date: Oct. 8, 1998

(30) Foreign Application Priority Data

Mar. 28, 1997 (FR) .................................................. 97 03833

(51) Int. Cl.$^7$ ................................ D04H 3/00; D04H 3/10
(52) U.S. Cl. ............................. 156/181; 156/91; 156/92; 156/93; 156/148; 156/155; 156/166; 156/180; 428/66.2; 428/102; 428/114; 188/18 A; 188/218 XL
(58) Field of Search .................................. 156/91, 92, 93, 156/148, 155, 166, 180, 181, 184, 191, 192, 195, 290, 425; 428/36.3, 37, 66.2, 101, 102, 105, 107, 109, 112, 114, 542.8; 112/412, 415; 188/18 A, 71.4, 218 XL

(56) References Cited

U.S. PATENT DOCUMENTS

| | | |
|---|---|---|
| 3,000,432 | 9/1961 | Olken . |
| 4,677,831 | 7/1987 | Wunner . |
| 5,173,314 | 12/1992 | Hosoi . |
| 5,662,855 * | 9/1997 | Liew et al. ............................. 264/258 |
| 5,952,075 * | 9/1999 | Clarke et al. ........................ 428/66.2 |

FOREIGN PATENT DOCUMENTS

| | | |
|---|---|---|
| 0 528 336 A2 | 2/1993 | (EP) . |
| 0 721 835 A2 | 7/1996 | (EP) . |
| 2 490 687 | 3/1982 | (FR) . |
| 1 643 656 | 8/1990 | (FR) . |
| 2 268 759 A | 1/1994 | (GB) . |
| WO 97/20092 | 6/1997 | (WO) . |

* cited by examiner

Primary Examiner—Michael W. Ball
Assistant Examiner—Jessica Rossi
(74) Attorney, Agent, or Firm—Weingarten, Schurgin, Gagnebin & Hayes LLP

(57) ABSTRACT

To make an annular fiber structure, a strip-shaped fabric (50), is used which is made up of two superposed unidirectional sheets, with the directions of the sheets forming opposite angles relative to the longitudinal direction of the strip, the two sheets being bonded together so as to form deformable elementary meshes, the fabric being wound while being deformed so as to transform it into a flat helix, the elementary meshes deforming in such a manner that variation in mass per unit area between the inside and outside diameters of the turns remains small, and the flat turns are pressed against one another.

17 Claims, 6 Drawing Sheets

METHOD FOR PRODUCING RING-SHAPED FIBROUS STRUCTURES, IN PARTICULAR FOR MAKING PARTS IN COMPOSITE MATERIAL

CROSS REFERENCE TO RELATED APPLICATIONS

This is a National Entry from PCT Application PCT/FR98/00598, filed Mar. 25, 1998, which claims priority from French Application No. 97/03833, filed Mar. 28, 1997.

BACKGROUND OF THE INVENTION

The present invention relates to a method of making annular fiber structures, in particular preforms for manufacturing annular parts of composite material.

A particular but non-exclusive field of application of the invention lies in making annular preforms for the manufacture of brake disks or clutch disks out of composite material, and in particular carbon-carbon (C/C) composite material.

Annular parts of composite material, such as brake disks or clutch disks, are constituted by a fiber reinforcing structure or "preform" which is densified by a matrix. For C/C composite disks, the preform is made of carbon fibers or of fibers made of a carbon precursor which is transformed into carbon by heat treatment after the preform has been made. A particular carbon preform that is available in fiber form is pre-oxidized polyacrylonitrile (PAN). The preform can be densified either by a liquid-impregnation process using a liquid precursor for carbon, e.g. a resin, and then transforming the precursor by heat treatment, or else by chemical vapor infiltration, or indeed by calefaction. For calefaction, the preform is immersed in a matrix-precursor liquid and the preform is heated, e.g. by contact with an induction core or by direct coupling with an induction coil, so that the precursor is vaporized on making contact with the preform and can infiltrate to form the matrix by depositing within the pores of the preform.

A well known method of making fiber preforms for parts made of composite material consists in superposing and needling together layers or plies of a two-dimensional fiber fabric. By way of example, the fiber fabric can be a woven cloth. The cloth may optionally be covered in a web of fibers for producing the fibers that are suitable for being displaced by needles through the superposed plies; this applies in particular when the cloth is made of fibers that are difficult to needle without being broken, and in particular carbon fibers. Such a method is described in particular in documents FR-A-2 584 106 and FR-A-2 584 109 respectively for making preforms that are plane and for making preforms that are bodies of revolution.

An annular preform for a disk can be cut out from a thick plate made up of layers that have been superposed flat and needled together. The loss of material then amounts to nearly 50% which, for preforms made of carbon fibers or of carbon precursor fibers, constitutes a very large expense.

In order to reduce this loss, proposals are made in document EP-A-0 232 059 to build up a preform by superposing and needling together annular layers, each of which is formed by assembling together a plurality of sectors. The sectors are cut out from a two-dimensional fabric. The loss of material is less than when cutting out entire rings, but it is still not negligible. In addition, the method is rather difficult to implement and to automate, in particular because of the need to position the sectors correctly while ensuring that they are offset from one layer to another so as to avoid superposing lines of separation between sectors.

It might be envisaged that annular preforms could be cut out from sleeves made by rolling a strip of cloth onto a mandrel while simultaneously needling it, as described in above-mentioned document FR-A-2 584 107. That method is relatively easy to implement without significant loss of fiber material. However, in an application to friction disks, and contrary to the other embodiments described above, the plies of the preform are then disposed perpendicularly to the friction faces, and in some cases that configuration is not optimal.

Another known technique for making fiber preforms for annular parts made of composite material consists in using a textile product in the form of a helical or spiral strip, which product is wound as flat superposed turns. The textile product can be a woven cloth made up of helical warp threads and of radial weft threads.

As described in documents FR-A-2 490 687 and FR-A-2 643 656, the spiral helical shape is given to the cloth by making use of a frustoconical roller for the warp threads being reeled out from individual spools mounted on a creel. In a cloth made in that way, the spacing between the radial weft threads increases across the width of the helical cloth between the inside diameter and the outside diameter.

In order to conserve a substantially uniform nature for the cloth across its entire width, it is proposed in the two above-mentioned documents to introduce additional weft threads that extend over a portion only of the width of the cloth, starting from its outside diameter. That solution gives rise to significant extra cost in manufacturing the cloth, and is a non-negligible source of defects. Another solution, described in patent application FR 95 14 000, consists in increasing the mass per unit area of the warp of the helical cloth between the inside diameter and the outside diameter thereof so as to ensure that in terms of density per unit volume of the preform, the decrease in weft density is compensated approximately. Although less expensive than increasing the density of weft fibers towards the outside diameter, that solution nevertheless remains rather complex since it requires the use of warp threads of varying weight and/or varying mass per unit area between the inside diameter and the outside diameter of the cloth.

In yet another known technique, fiber preforms for annular parts made of composite material, and in particular for brake disks, are made by winding flattened tubular braids helically. The tubular braids can be rectilinear, as described in document EP-A-0 528 336. The braids are then deformed so as to be wound into a helix. Longitudinal threads can be added during manufacture of the braid so as to improve the dimensional stability of the preform and so as to compensate for variation in density per unit area between the inside diameter and the outside diameter of the wound flattened braid. Proposals have also been made in document EP-A- 0 683 261 to use helical tubular braids. That makes it possible to overcome the limits on deformability of rectilinear tubular braids when they are being wound into a helix. Nevertheless, the variation in density per unit area still needs to be compensated by adding longitudinal fibers or by juxtaposing a plurality of flattened braids of small width between the inside diameter and the outside diameter. Those solutions make preform manufacture relatively complex, and thus expensive, without providing a completely satisfactory solution to the problem of variation in density per unit area.

BRIEF SUMMARY OF THE INVENTION

Thus, an object of the present invention is to provide a method that enables annular preforms to be made for composite material parts without giving rise to significant wastage of material and while conserving substantially constant density per unit area between the inside diameter and the outside diameter of the structure.

Another object of the present invention is to provide such a method in which the cost of implementation is significantly less than that of the prior art methods that enable similar results to be obtained.

To this end, the invention provides a method of making an annular fiber structure by winding a flat helix of a fiber fabric in the form of a deformable strip, the method steps comprising in:

supplying a fiber fabric in the form of a deformable strip made up of two superposed unidirectional sheets, each constituted by mutually parallel fiber elements, the direction of the fiber elements is one sheet forming angles of opposite signs with respect to the direction of the fiber elements in the other sheet and relative to the longitudinal direction of the strip, and the two sheets being bonded together so as to form deformable elementary meshes;

deforming the strip shaped fabric into a helix having turns by modifying the shape of the elementary meshes so that their radial size increases towards the inside diameter of the helix, whereby the variation in mass per unit area between the inside and outside diameters of the turns is minimized; and winding the deformed fabric into a flat helix applying the deformed turns flat against one another by so as to obtain an annular fiber structure whose radial dimension between its inner diameter and outer diameter corresponds to the width of the deformed strip-shaped fabric.

Advantageously, the directions of the fiber/elements in the sheets relative to the longitudinal direction of the strip form angles having absolute values that preferably lie in the range of 30° to 60°, so as to maintain the ability of the elementary meshes to deform in the longitudinal direction and in the transverse direction. In a preferred embodiment, these angles are equal to +45° and −45°. The sheets are bonded together while preserving the ability of the elementary meshes to deform at their apexes, e.g. by sewing or by knitting, using threads that pass from one face of the fabric to the other, or indeed by preneedling or by localized needling.

Such a fabric is particularly advantageous because of its ability to deform which enables it to be wound as a flat helix without forming thickenings or wrinkles on its surface and with substantially uniform distribution of the fiber elements in the sheets, thereby giving the helix a density per unit area whose variation between the inside and outside diameters can remain within limits that are acceptable, without there being any need for compensation.

Also advantageously, the flat superposed turns formed by winding the fabric into a helix are bonded to one another. Bonding between the turns can be performed, for example, by needling. The needling can be performed after winding and optional compression of the annular structure, or else while winding is taking place.

The strip-shaped fabric can be deformed by passing between two rotary disks with the longitudinal edges of the fabric being held between the disks, e.g. by clamping, or else the fabric can be deformed by passing over at least one frustoconical roller.

It is thus possible to form an annular fiber structure without loss of fiber material and while conserving fiber density that varies little between the inside diameter and the outside diameter without any need to introduce additional elements as in prior art methods, thereby greatly simplifying implementation.

BRIEF DESCRIPTION OF THE FIGURES

The invention will be better understood on reading the following description given by way of non-limiting indication with reference to the accompanying drawings, in which.

DETAILED DESCRIPTION OF THE INVENTION

The fiber fabric used in a method of the invention is made by superposing and binding together two unidirectional sheets made up of mutually parallel fiber elements.

In well known manner, a unidirectional sheet can be obtained by spreading out and laying a tow or cable, or, as described in the detailed description below, by paralleling threads taken from different spools.

It will be observed that a method of making a multi-axial fiber fabric from unidirectional sheets obtained by spreading out tows is described in the French patent application filed on Mar. 28, 1997 under the No. 97/03832 and entitled "A method and a machine for making multi-axial fiber sheets", the contents of which is incorporated herein by reference.

Figure 1:
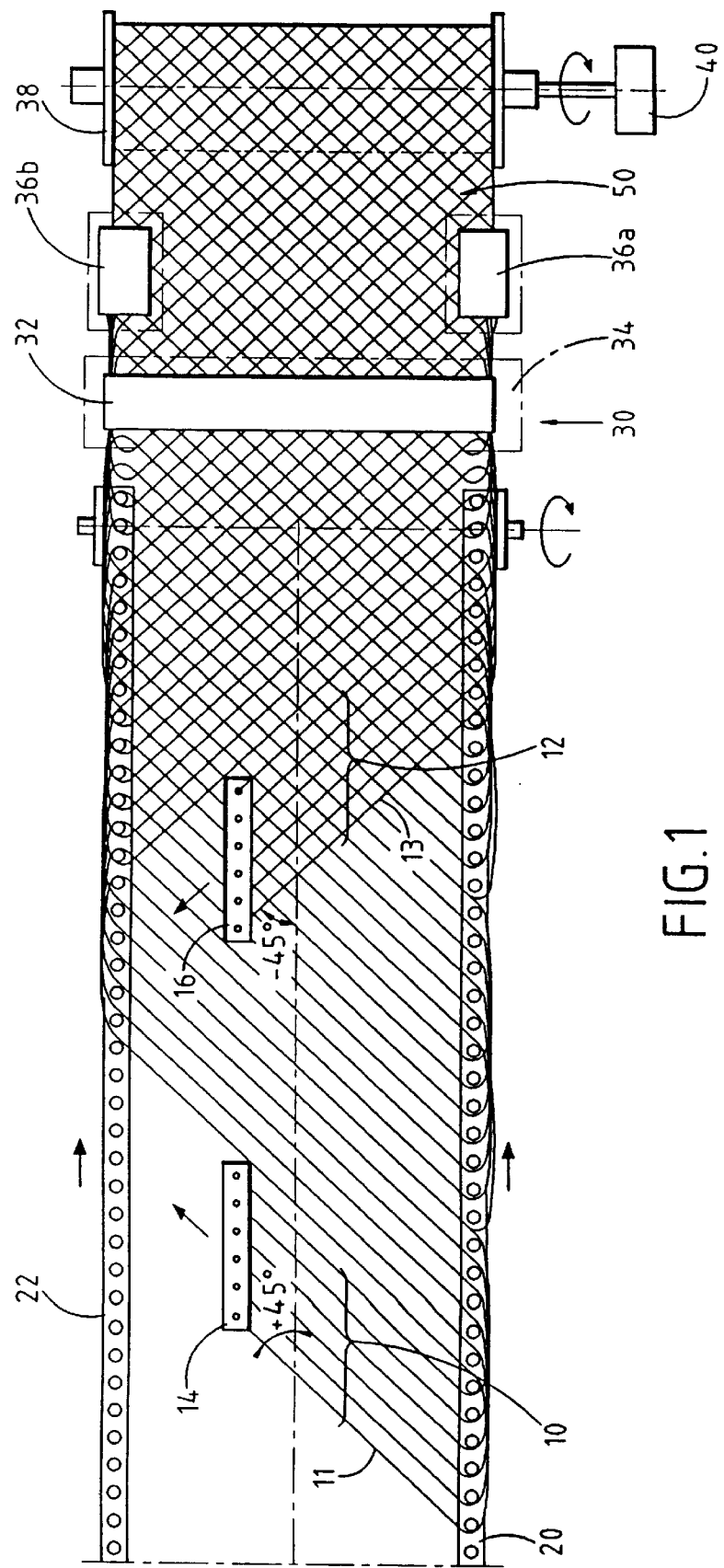
FIG. 1 is a highly diagrammatic view of an installation enabling a fiber texture to be made in the form of a deformable strip suitable for use in implementing the method of the invention.

FIG. 1 shows very diagrammatically an installation that receives two unidirectional sheets 10, 12 made up of threads, and that produces a fabric in the form of a strip by superposing two sheets that make angles of opposite signs with the longitudinal direction of the strip, and in the example these angles are equal to +45° and −45°.

The fibers constituting the unidirectional sheets 10 and 12 are of a material that is selected as a function of the use intended for the fabric in strip form. The fibers can be organic or inorganic, e.g. carbon fibers or ceramic fibers, or fibers made of a precursor for carbon fibers or ceramic fibers. It will be observed that the fibers constituting the two sheets can be of different kinds. It is also possible to use fibers of different kinds in each of the sheets.

The strip is formed by bringing in successive segments of the sheet 10 that is at an angle of +45° relative to the longitudinal direction of the strip that is to be made, and by juxtaposing these segments in said direction. Each segment is brought in over a length such that it extends from one longitudinal edge of the strip to its other longitudinal edge. In similar manner, successive segments of the sheet 12 are brought in at an angle of −45° relative to the longitudinal direction of the strip to be made and they are juxtaposed, with the sheet segments 12 being placed over the sheet segments 10.

In the example shown, the threads 11, 13 constituting each of the sheets 10, 12 are tensioned between two spiked endless chains 20, 22 that are driven synchronously. The ends of the sheets 10 and 12 are guided by respective carriages 14 and 16 that receive the threads 11 and 13 from respective spools (not shown) and that are driven back and forth between the longitudinal edges of the strip to be made. At each end of the stroke of the carriages, the sheets are turned around the spikes of the corresponding spiked chain. The spiked chains 20 and 22 are caused to advance continuously or discontinuously in time with the sheets 10 and 12 being brought in so as to cause successive sheet segments to be juxtaposed. An installation of this type is known, e.g. from document U.S. Pat. No. 4,677,831, so a more detailed description is not necessary.

The strip formed by superposing the sheets 10 and 12 is taken off the spiked chains 20 and 22 at the downstream end of their top edges for admission into a bonding device 30. In the example shown, bonding is performed by needling by means of a needle board 32 which extends over the entire width of the strip being formed, the strip passing over a perforated plate 34 whose perforations are situated in register with the needles of the board 32. The distribution of the needles on the needle board 32 is determined so as to perform needling that is localized so that the bonding between the two sheets defines individual stitches that are deformable, e.g. in parallelogram manner.

The bonding between the sheets of the resulting strip-shaped fiber fabric 50 confers sufficient cohesion to enable the fabric to be stored on a roll 38 driven by a motor 48 synchronously with the spiked chains 20 and 22. Between the bonding device 30 and the roll 38, the edges of the strips 50 are cut by means of rotary dies 36*a* and 36*b*.

Figure 2:
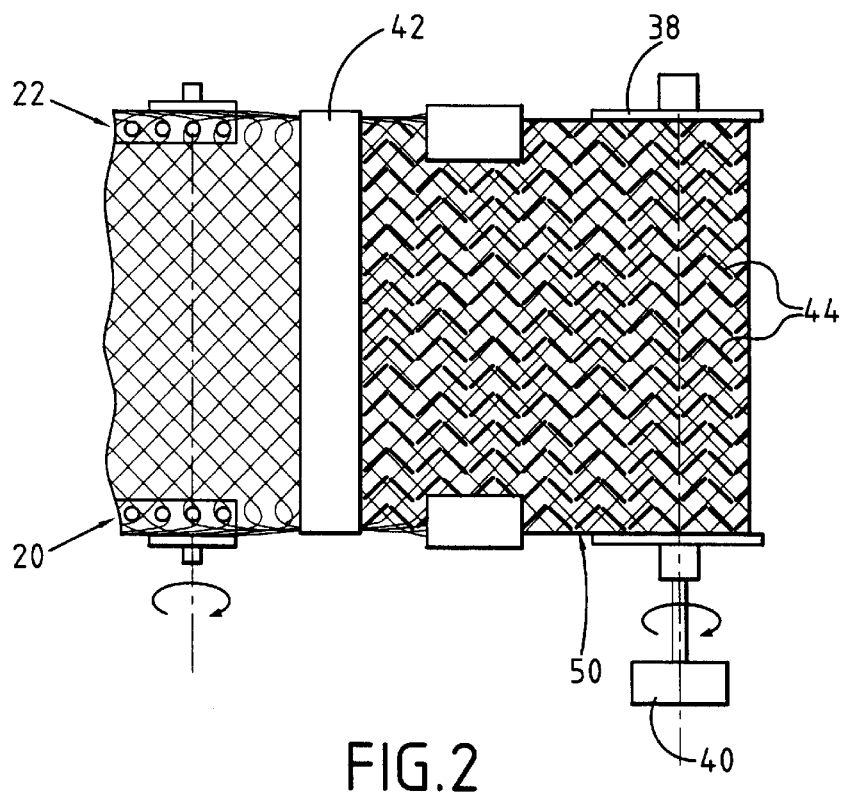
FIGS. 2, 3A, 3B, and 3C are views illustrating one way in which a fiber fabric suitable for use in implementing a method of the invention can be bonded by knitting.
Figure 3A:
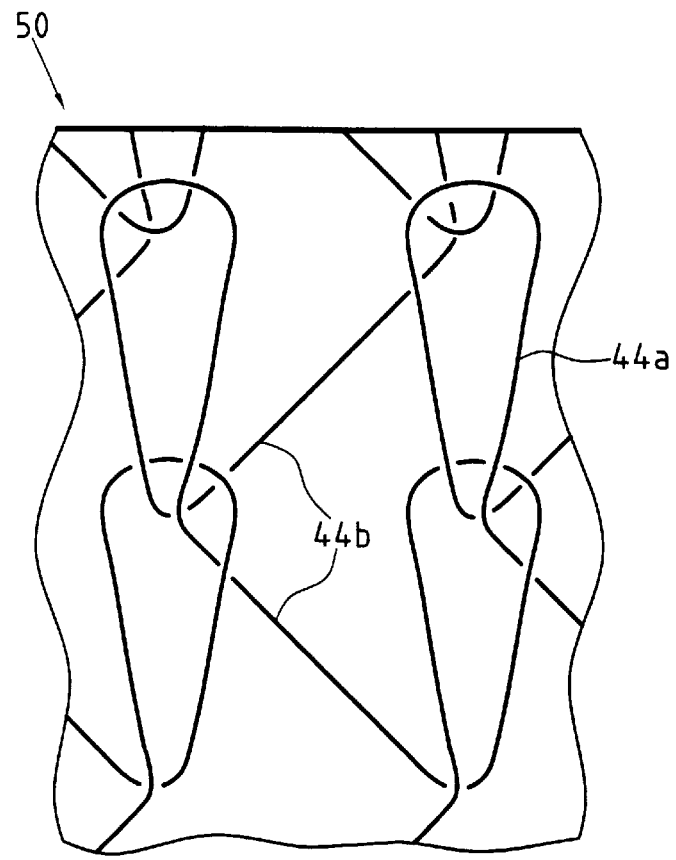
Figure 3B:
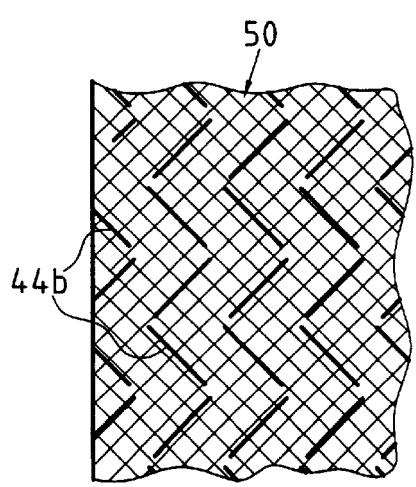

FIGS. 2, 3A, and 3B show a preferred variant implementation of bonding between the sheets. In this variant, bonding is performed not by needling, but by knitting. The superposed sheets taken from the spiked chains 20 and 22 are received by a knitting machine 42 which performs knitting, i.e. it makes a two-dimensional structure, by means of a thread that passes from one face to the other of the fabric 50 (FIG. 2). FIG. 3A shows in detail the knitting stitch 44 used, while FIGS. 3B and 3C show the front and the back faces of the fabric 50 bonded by the knitting.

As shown in FIG. 3A, the knitting stitch forms interlaced loops 44*a* that are elongate in the longitudinal direction of the fabric 50, forming a plurality of parallel rows, together with V-shaped or zigzag-shaped paths 44*b* interconnecting the loops in adjacent rows. The fabric 50 is situated between the paths 44*b* situated on the front face (FIG. 3B) and the loops 44*a* situated on the back face (FIG. 3C), giving the knit the appearance of a zigzag stitch on one face and a chain stitch on the other face. The knitting stitch covers a plurality of threads in each sheet, the number depending on the chosen gauge.

Figure 3C:
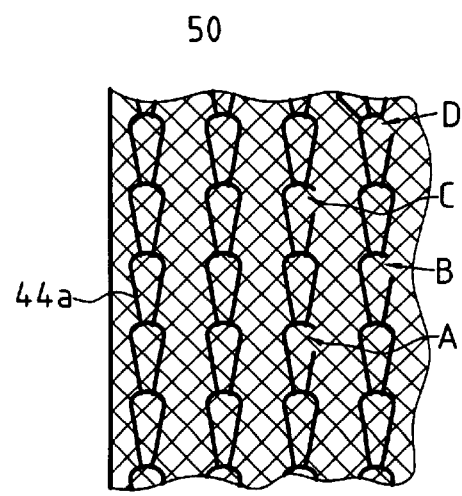

The bonding points between the zigzag paths 44B and the loops 44*a*, such as the points A, B, C, and D in FIGS. 3B and 3C defined the apexes of individual deformable meshes. In this case, both the meshes defined by the knitting stitch are deformable, as are the meshes defined by the crossover points between the threads of the sheets that form deformable parallelograms.

Figure 4:
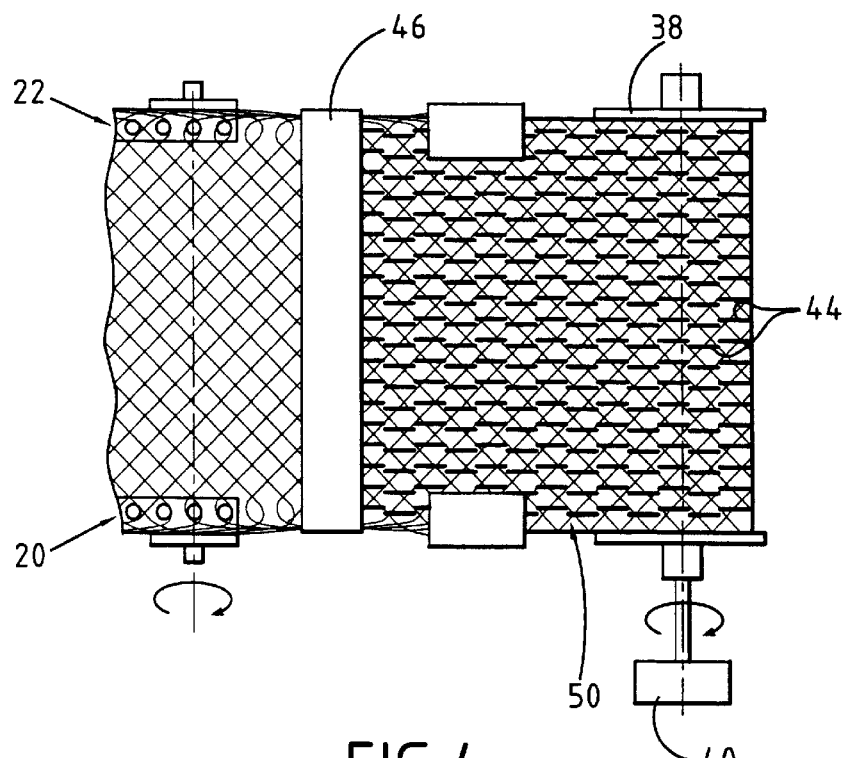
FIGS. 4, 5A, 5B, and 5C are views showing another way in which a fiber fabric suitable for implementing a method of the invention can be bonded by knitting.

FIG. 4 shows another variant in which the bonding between the sheets is achieved by knitting. The superposed sheets taken from the spiked chains 20 and 22 are received by a knitting machine 46 which bonds together the sheets in a plurality of lines parallel to the longitudinal edges of the fabric 50.

Figure 5A:
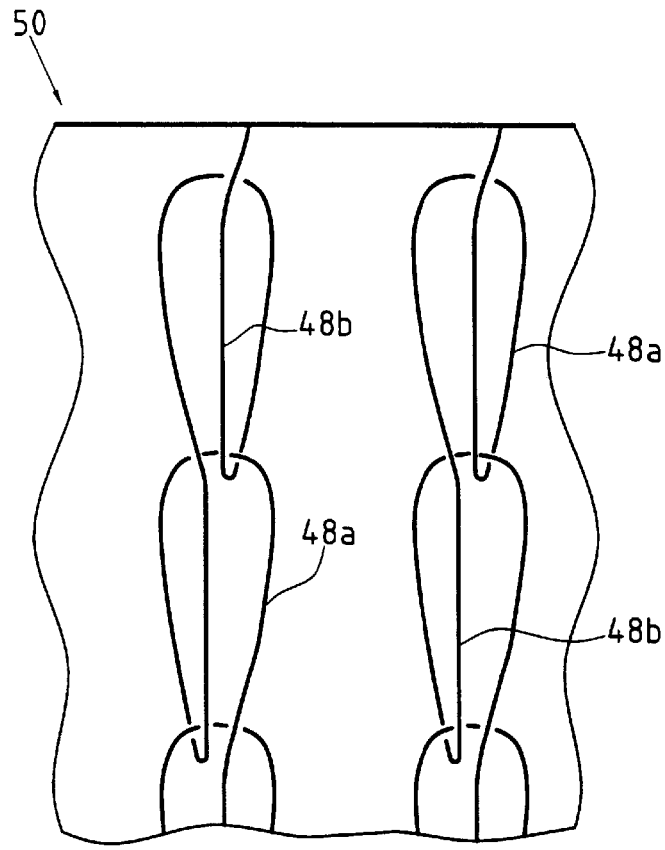
Figure 5B:
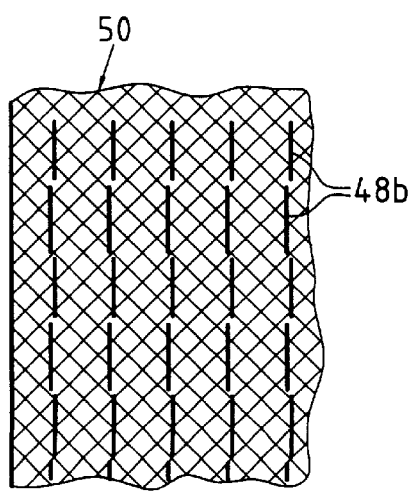
Figure 5C:
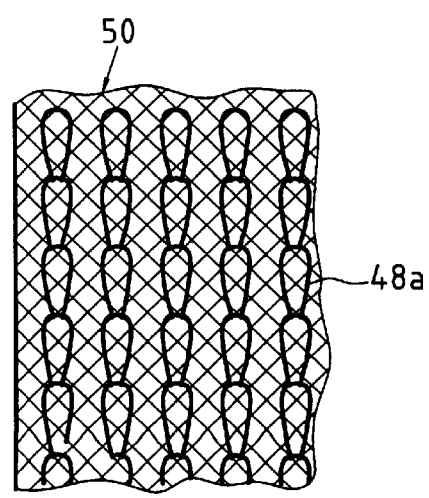

As shown in FIG. 5A, each knitting stitch 48 is a chain stitch with loops 48*a* linked via rectilinear segments 48*b*, the fabric 50 is situated between the segments 48*b* that are visible on the back face of the fabric (FIG. 5B) and the loops 48*a* that are visible on its front face (FIG. 5C).

The knitting stitch for the embodiments of FIGS. 2 and 4 can be made of a sacrificial material, i.e. a material that can subsequently be eliminated without damaging the fibers constituting the sheets. For example it is possible to use threads of a material suitable for being eliminated by heat without leaving any residue, or threads of a material that is suitable for being eliminated by a solvent, for example water-soluble polyvinyl alcohol threads.

It is also possible to use a knitting thread made of a material that is compatible with the intended subsequent use of the fabric. When the fabric is intended for making preforms for use in the manufacture of composite material parts, the knitting or sewing thread may be made of a material compatible with the matrix material of the composite material, i.e. preferably of the same kind as or miscible in the matrix without reacting chemically therewith.

Other methods of bonding by knitting or indeed by sewing could also be selected.

The resulting strip-shaped fabric is particularly advantageous because of its ability to deform which enables it to be wound flat and helically without giving rise to surface deformation (wrinkles or slippage), with this being because the elementary meshes 52 of the texture 50 behave like deformable parallelograms whose deformation is not constrained by the selected method of bonding, the method of bonding by knitting as shown in FIGS. 2, 3A, 3B, and 3C being the method that is preferred in this respect.

Figure 6:
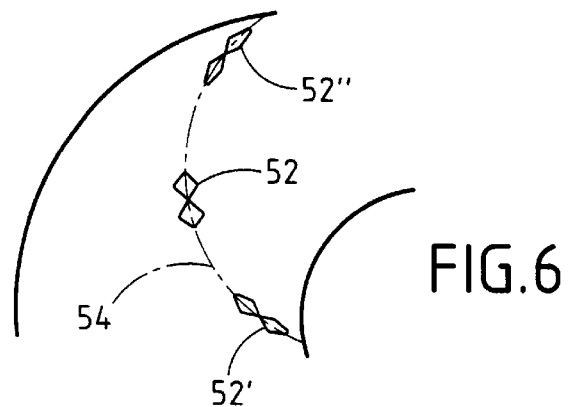
FIG. 6 is a diagrammatic detail view showing how a fiber fabric, such as that made by the installation of FIG. 1, deforms when it is wound flat in a helix.

During winding (FIG. 6), the elementary meshes 52' situated close to the inside diameter of the helix being formed deform by being elongated radially and by shrinking longitudinally, while the elementary meshes 52" situated in the vicinity of the outside diameter of the helix deform by shrinking in the radial direction and lengthening in the longitudinal direction. As a result, the density of fibers per unit area remains substantially constant or varies only little between the inside diameter and the outside diameter, which is particularly advantageous for making homogenous preforms for use in the manufacture of composite material parts. In FIG. 6, chain-dotted line 54 shows the deformation of one of the initial directions of the strip 50.

When bonding is by knitting or by sewing, the deformation of the elementary meshes formed by the threads of the fabric is accompanied by deformation of the knitting or sewing stitches. Thus, for the knitting stitch of FIGS. 3A to 3C, the deformation gives rise to lengthening or shortening of the portions of the thread forming the chain-stitch loops and by opening or closing of the angles formed by the zigzag paths.

Figure 7A:
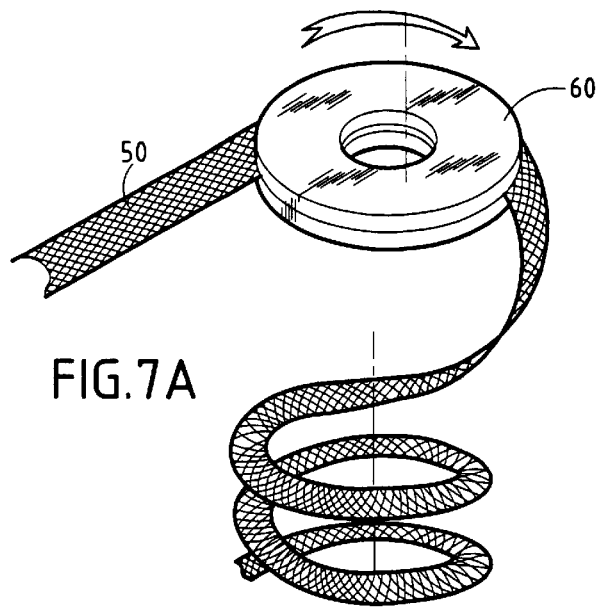
FIGS. 7A and 7B are diagrammatic views showing a device for helically winding a fiber fabric to implement a method of the invention.
Figure 7B:
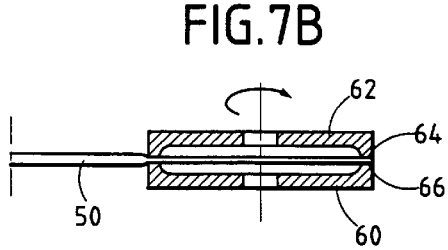

The fabric 50 can be rolled into a flat helix with deformation by causing the fabric to pass between two annular disks or plates 60 and 62 while holding the fabric along its longitudinal edges between the disks (FIG. 7A). The fabric can be held, for example, by clamping its edges between circular ribs 64 and 66 formed on the inside faces of the disks 60 and 62, or at least on the inside face of one of the disks (FIG. 7B).

Figure 8A:
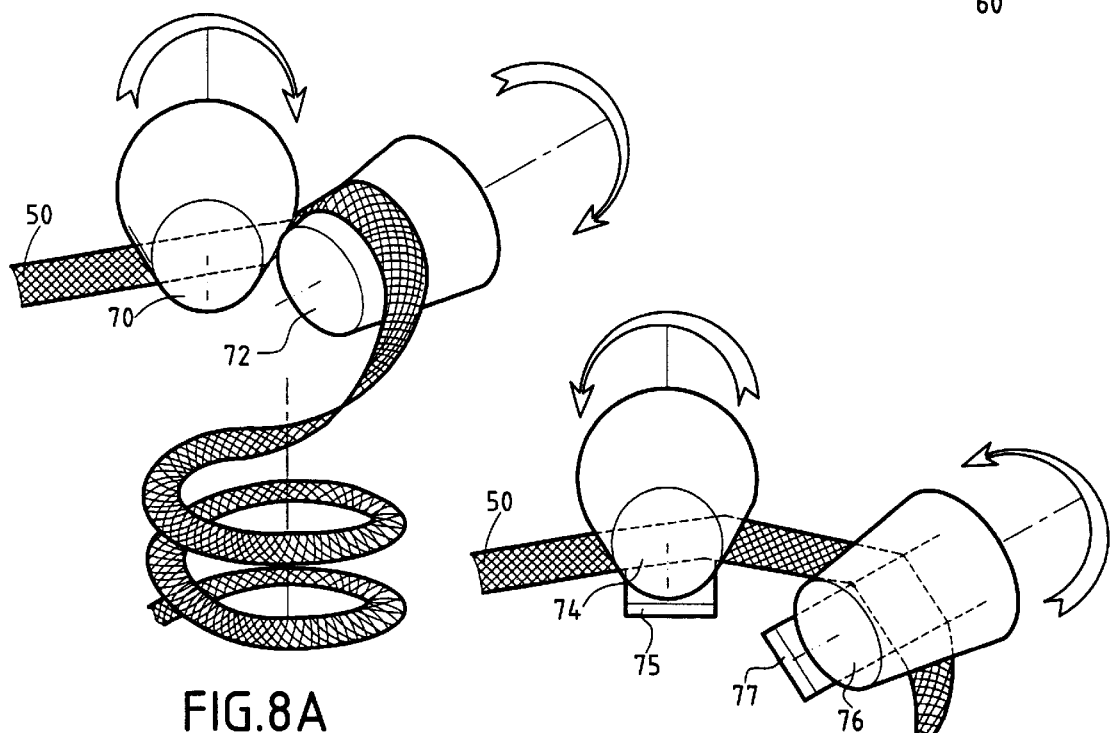
FIGS. 8A and 8B are diagrammatic views showing two other devices for helically winding a fiber fabric to implement a method of the invention.

In another embodiment, the fabric is wound and deformed by causing it to pass over at least one frustoconical roller. The number of rollers used and their angles at the apex are selected as a function of the desired degree of deformation. In the example shown in FIG. 8A, two identical frustoconical rollers 70 and 72 are used which are rotated by respective motors (not shown). The fabric is caused to fit closely over a fraction of the periphery of at least one of the rollers.

Figure 8B:
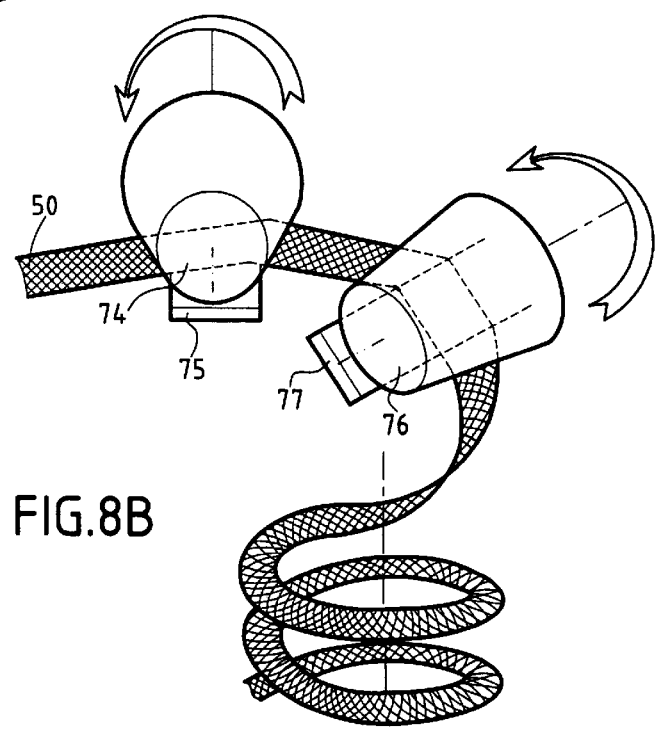

In the example of FIG. 8B, the fabric is caused to pass between a first rotary frustoconical roller 74 and a smooth presser plate 75, and also between a second rotary frustoconical roller 76 and a smooth presser plate 77. The rollers are rotated by respective motors (not shown) and they deform the fabric by friction.

It is possible to use a single frustoconical roller against which the fabric is pressed. Under such circumstances, it is the smaller circle described by one of the edges of the fabric on the frustoconical roller that defines the inside diameter of the helix.

Figure 9:
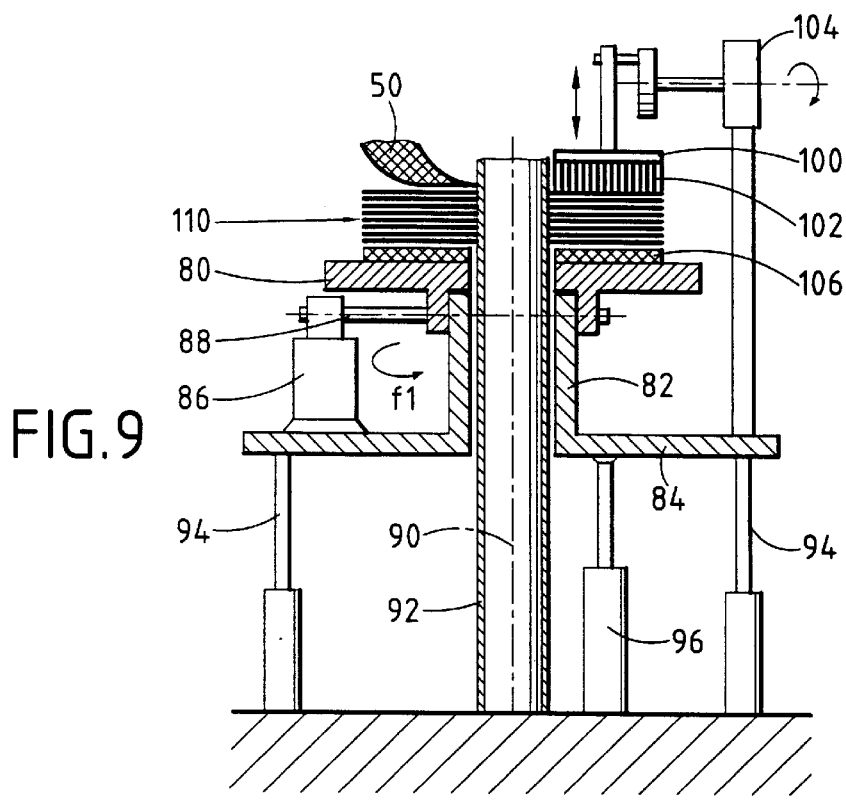
FIG. 9 is a diagrammatic view showing an implementation of a method of making an annular fiber structure in accordance with the invention.

An annular fiber structure can be built up by superposing the flat turns formed by winding the fabric 50 helically and by bonding the turns to one another by needling as winding takes place (FIG. 9). This can be performed continuously while deforming the fiber fabric into a flat helix or after intermediate storage thereof.

The fabric 50 as deformed, e.g. by passing between two disks as shown in FIG. 5, is wound into superposed flat turns on a turntable 80. The turntable 80 is mounted on a vertical shaft 82 secured to a support 84. The support 84 also carries a motor 86 which drives the turntable 80 so as to rotate it about its vertical axis 90 (arrow f1) via a belt 88.

The assembly comprising the support 84 and the turntable 80 is vertically movable along a fixed central guide tube 92 having the same axis 90. At its top end, the tube 92 supports the device for deforming the strip into a helix. The support 84 stands on vertical telescopic rods 94, with vertical displacement of the support 84 being under the control of one or more actuators 96.

As the strip 50 is wound flat onto the rotating turntable 80, it is needled by means of a board 100 carrying needles 102 and driven with vertical reciprocating motion. The motion of the needle board is driven by a motor 104 via a crank and connecting rod type transmission. The motor 104 is carried by the support 84.

The strip 50 is needled at a density per unit area and at a depth that are substantially constant. To obtain a constant density for the strokes of the needles 102 over the entire area of an annular turn of the strip 50, the needle board 100 is sector-shaped, corresponding to a sector of an annular layer of the cloth, with the needles being distributed uniformly over said sector, while the turntable 80 supporting the structure 110 that is being built up is itself driven to rotate at a speed that is constant.

The depth of needling, i.e. the distance the needles 102 penetrate on each stroke into the structure 110 is maintained substantially constant and is equal, for example, to the thickness formed by a plurality of superposed layers of cloth. To this end, as the strip 50 is being wound on the turntable 80, the turntable is displaced vertically downwards through the appropriate distance to ensure that the relative position between the surface of the preform and the needle board at one end of its vertical stroke remains unaltered. Once the preform 110 has been built up, after the last turn of the strip 50 has been put into place, a plurality of needling passes are performed while continuing to cause the turntable 80 to rotate so that the density of needling per unit volume in the surface layers of the cloth remains substantially the same as within the remainder of the preform. During at least a portion of these final needling passes, the turntable can be caused to move downwards progressively, as during the preceding stages. This principle of needling to constant depth by progressively lowering the preform support and by applying final needling passes is known, and in particular it is described in above-mentioned document FR-A-2 584 106.

In addition, the turntable 80 is coated in a protective layer 106 into which the needles can penetrate without being damaged while they are needling the initial turns of the strip 50. The protective layer 106 can be constituted by a base felt, e.g. a polypropylene felt, covered in a sheet of plastics material, e.g. of polyvinyl chloride, thereby preventing the needles during their upstroke from entraining fibers from the base felt into the preform 110.

Figure 10:
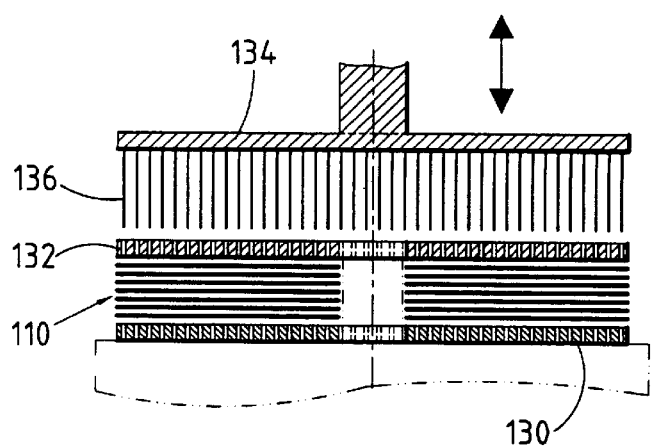
FIG. 10 is a diagrammatic view showing another implementation of a method of making an annular fiber structure in accordance with the invention.

In another embodiment of the fiber structure 110, the turns formed by helically winding the deformed fabric are applied against one another, and the fiber structure is compressed by means of tooling comprising a base plate 130 and a top plate 132 (FIG. 10). Compression is performed so as to obtain the desired density of fibers per unit volume. The turns can then be bonded together by needling using a needle board 134 whose needles 136 pass through perforations in the top plate 132 and penetrate all the way through the thickness of the structure 110. Perforations can also be formed in the bottom plate 130 in register with the needles.

An annular fiber structure obtained as described above is suitable for use as a preform in manufacturing an annular part out of composite material, e.g. a brake disk.

When the unidirectional sheets have been bonded by means of a thread of sacrificial material, the thread is eliminated by dissolving or by heat treatment prior to the preform being densified.

When the material constituting the fibers of the resulting fiber structure is a precursor for the fiber reinforcement of the composite material, the precursor is transformed prior to the preform being densified, or while its temperature is being raised prior to densification.

The preform is densified in conventional manner by a liquid process or by chemical vapor infiltration so as to form a deposit of material constituting the desired material within the accessible pores of the preform.

Although the above description relates to using a deformable fiber fabric made up of two bonded-together unidirectional sheets forming angles of +45° and −45° relative to the longitudinal direction of the sheet, it will be understood that the method of the invention can be implemented with deformable strips in which the two unidirectional sheets form angles of opposite signs having absolute values that can differ from 45°, and that can possibly differ from each other. Nevertheless, in order to conserve sufficient deformation capacity for the mesh, it is preferable for said angles to have an absolute value lying in the range 30° to 60°, and also preferably said angles should have the same absolute value so as to conserve symmetry in the deformable strip.

In addition, it is assumed above that the fiber strip is wound into a helix on leaving the laying installation of FIG. 1. In a variant, and even preferably, when the radial size of the annular preforms to be made is not too large, the fiber strip leaving the laying installation is initially subdivided into a plurality of deformable strips, not necessarily of the same width, by being cut parallel to the longitudinal direction.

What is claimed is:

1. A method of making an annular fiber structure by winding a flat helix of a fiber fabric in the form of a deformable strip, the method steps comprising:

supplying a fiber fabric in the form of a deformable strip made up of two superposed unidirectional sheets, each constituted by mutually parallel fiber elements, the direction of the fiber elements in one sheet forming angles of opposite signs with respect to the direction of the fiber elements in the other sheet and relative to the longitudinal direction of the strip, and the two sheets being bonded together so as to form deformable elementary meshes;

deforming the strip-shaped fabric into an helix having turns by modifying the shape of the elementary meshes so that their radial size increases towards the inside diameter of the helix turns, whereby the variation in mass per unit area between the inside and outside diameters of the turns is minimized; and winding the deformed fabric into a flat helix by applying the deformed turns flat against one another so as to obtain an annular fiber structure whose radial dimension between its inner diameter and outer diameter corresponds to the width of the deformed strip-shaped fabric.

2. A method according to claim 1, wherein said angles of opposite signs have same absolute value.

3. A method according to claim 1, wherein said superposed unidirectional sheets are bonded together by needling.

4. A method according to claim 1, wherein deforming the strip-shaped fabric into an helix includes passing the fabric over at least one frustoconical roller.

5. A method according to claim 1, wherein the strip-shaped fabric is subdivided into a plurality of deformable strips by longitudinally cutting up a strip of greater width prior to deforming each strip and winding each deformed strip into a flat helix to obtain a respective annular fiber structure.

6. A method according to claim 1, wherein said angles of opposite signs have an absolute value lying in the range of 30° to 60°.

7. A method according to claim 6, wherein said absolute value is equal to 45°.

8. A method according to claim 1, wherein said superposed unidirectional sheets are bonded together by knitting.

9. A method according to claim 8, wherein said knitting uses a knitting stitch that forms a zigzag on one face of the strip-shaped fabric and a chain stitch on the face opposite to said one face.

10. A method according to claim 8, wherein said sheets are bonded together by a thread of sacrificial material.

11. A method according to claim 1, wherein said superposed unidirectional sheets are bonded together by sewing.

12. A method according to claim 11, wherein said sheets are bonded together by a thread of sacrificial material.

13. A method according to claim 1, wherein said superposed flat turns are bonded to one another.

14. A method according to claim 13, wherein said superposed flat turns are bonded to one another by needling.

15. A method according to claim 14, wherein said needling is performed progressively as the fabric is wound into a flat helix.

16. A method according to claim 1, wherein deforming the strip-shaped fabric into an helix is performed by passing the strip-shaped fabric between two rotary disks between which the fabric is held along its longitudinal edges.

17. A method according to claim 16, wherein the strip-shaped fabric is clamped along its longitudinal edges between the disks.

* * * * *